United States Patent
Adel-Vu et al.

(10) Patent No.: US 12,223,440 B2
(45) Date of Patent: Feb. 11, 2025

(54) DEVICE AND METHOD FOR DETERMINING A KNOWLEDGE GRAPH

(71) Applicant: Robert Bosch GmbH, Stuttgart (DE)

(72) Inventors: Heike Adel-Vu, Stuttgart (DE); Jannik Stroetgen, Karlsruhe (DE); Lukas Lange, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 966 days.

(21) Appl. No.: 17/237,669

(22) Filed: Apr. 22, 2021

(65) Prior Publication Data
US 2021/0342716 A1    Nov. 4, 2021

(30) Foreign Application Priority Data
Apr. 30, 2020   (DE) .................... 20172432.5

(51) Int. Cl.
*G06N 5/04*    (2023.01)
*G06N 5/022*   (2023.01)
*G06N 20/00*   (2019.01)

(52) U.S. Cl.
CPC ............ *G06N 5/04* (2013.01); *G06N 5/022* (2013.01); *G06N 20/00* (2019.01)

(58) Field of Classification Search
None
See application file for complete search history.

(56) References Cited

U.S. PATENT DOCUMENTS

| 2011/0137919 A1* | 6/2011 | Ryu ............... G06F 16/9024 707/794 |
| 2020/0057946 A1* | 2/2020 | Singaraju ............ G06N 5/022 |

(Continued)

FOREIGN PATENT DOCUMENTS

| CN | 107015963 A | * | 8/2017 | .......... G06F 16/367 |
| CN | 107665252 A |   | 2/2018 |   |

(Continued)

OTHER PUBLICATIONS

Analyzing Knowledge Graph Embedding Methods from a Multi-Embedding Interaction Perspective; Author Tran et.al. (Year: 2019).*

(Continued)

*Primary Examiner* — Mandrita Brahmachari
(74) *Attorney, Agent, or Firm* — NORTON ROSE FULBRIGHT US LLP; Gerard A. Messina

(57) ABSTRACT

A device and method for determining a knowledge graph. A second embedding is determined for a first embedding for a word including a function. A first classification, which determines whether or not the word is an entity for the knowledge graph, or which defines to which entity or to which type of entity for the knowledge graph the word in the knowledge graph is to be assigned, is determined for the second embedding using a first classifier. A second classification, which defines to which type of embeddings from a plurality of types of embeddings the second embedding is to be assigned, is determined for the second embedding using a second classifier. At least one parameter for the function is trained in a training as a function of a gradient for the training of the first classifier and as a function of a gradient for the training of the second classifier.

9 Claims, 3 Drawing Sheets

(56) References Cited

U.S. PATENT DOCUMENTS

| | | | |
|---|---|---|---|
| 2020/0272674 A1* | 8/2020 | Lu | G06F 16/9536 |
| 2021/0117853 A1* | 4/2021 | Lynch | G06N 5/02 |
| 2021/0216880 A1* | 7/2021 | Jin | G06F 18/213 |
| 2021/0326531 A1* | 10/2021 | Kumar | G06F 40/279 |

FOREIGN PATENT DOCUMENTS

| | | | | |
|---|---|---|---|---|
| CN | 111046185 A | | 4/2020 | |
| CN | 109325131 B | * | 3/2021 | G06N 3/08 |

OTHER PUBLICATIONS

Tran, Hung Nghiep et al. "Analyzing Knowledge Graph Embedding Methods from a Multi-Embedding Interaction Perspectives" Proceedings of the 1st International Workshop on Data Science for Industry 4.0. arXiv:1903.11406v1. Mar. 27, 2019. 7 Pages.

Heinzerling, Benjamin et al. "BPEmb: Tokenization-free Pretrained Subword Embeddings in 275 Languages" arXiv preprint arXiv:1710.02187. Oct. 5, 2017. 5 Pages.

Hochreiter, Sepp et al. "Long Short-term Memory" Neural computation 9(8):1735-1780, 1997. Retrieved from the Internet on Apr. 22, 2021: https://www.bioinf.jku.at/publications/older/2604.pdf. 32 Pages.

Lafferty, John et al. "Conditional Random Fields: Probabilistic Models for Segmenting and Labeling Sequence Data" Proceedings of the 18th International Conference on Machine Learning, ICML '01. Jun. 2001. pp. 282-289. San Francisco, CA, USA. Retrieved from the Internet on Apr. 22, 2021: https://repository.upenn.edu/cgi/viewcontent.cgi?article=1162&context=cis_papers. 10 Pages.

Lample, Guillaume et al. "Neural Architectures for Names Entity Recognition" Proceedings of NAACL 2016. arXiv:1603.01360. Apr. 7, 2016. Retreived from the Internet on Apr. 22, 2021: https://arxiv.org/abs/1603.01360. 11 Pages.

Bojanowski, Piotr et al. "Enriching Word Vectors with Subword Information" Translation of the Association for Computational Linguistics 5. arXiv:1607.04606v2. Jun. 2017. Retrieved from the Internet on Apr. 22, 2021: https://arxiv.org/abs/1607.04606. 12 Pages.

Devlin, Jacob et al. "BERT: Pre-training of Deep Bidirectional Transformers for Language Understanding" Proceedings of NAACL-HLT 2019. pp. 4171-4186. Minneapolis, Minnesota Jun. 2-Jun. 7, 2019. Retreived from the Internet on Apr. 22, 2021: https://www.aclweb.org/anthology/N19-1423.pdf. 16 Pages.

Akbik, Alan et al. "Contextual String Embeddings for Sequence Labeling" Proceedings of the 27th International Conference on Computational Linguistics, pp. 1638-1649. Santa Fe, New Mexico, USA, Aug. 20-26, 2018. Retreived from the Internet on Apr. 22, 2021: https://www.aclweb.org/anthology/C18-1139.pdf. 12 Pages.

Akbik, Alan et al. "Pooled Contextualized Embeddings for Named Entity Recognition" Proceedings of NAACL-HLT 2019, pp. 724-728. Minneapolis, Minnesota, Jun. 2-Jun. 7, 2019. Retreived from the Internet on Apr. 22, 2021: https://www.aclweb.org/anthology/N19-1078.pdf. 5 Pages.

Ganin, Yaroslav et al. "domain-Adversarial Training of Neural Networks" Journal of Machine Learning Research 17 (2016) pp. 1-35. Retreived from the Internet on Apr. 22, 2021: https://arxiv.org/pdf/1505.07818.pdf.

* cited by examiner

DEVICE AND METHOD FOR DETERMINING A KNOWLEDGE GRAPH

CROSS REFERENCE

The present application claims the benefit under 35 U.S.C. § 119 of European Patent Application No. EP 20172432.5 filed on Apr. 30, 2020, which is expressly incorporated herein by reference in its entirety.

FIELD

The present invention relates to a device and to a method for determining a knowledge graph.

BACKGROUND INFORMATION

A knowledge graph is understood in knowledge-based systems to mean a structured storage of knowledge in the form of a graph. Knowledge graphs include entities and reflect relations between entities. Entities define nodes of the knowledge graph. A relation is defined as an edge between two nodes.

It is desirable to create a possibility of filling a knowledge graph.

SUMMARY

This may be achieved by a device and a method for determining a knowledge graph according to example embodiments of the present invention. In accordance with an example embodiment of the present invention, the knowledge graph includes entities and relations. To determine the knowledge graph, a classification decision is made with a model for a word regarding which entity is to be written in the knowledge graph or whether or not an entity is to be written for the word into the knowledge graph.

In accordance with an example embodiment of the present invention, the method for determining a knowledge graph provides that for a first embedding for a word having one function, a second embedding is determined, a first classification, which defines whether or not the word is an entity for the knowledge graph, or which defines to which entity or to which type of entity for the knowledge graph the word is to be assigned in the knowledge graph being determined for the second embedding using a first classifier, a second classification, which defines to which type of embeddings from a plurality of types of embeddings the second embedding is to be assigned being determined for the second embedding using a second classifier, at least one parameter for the function being defined as a function of at least one parameter for the first classifier and as a function of at least one parameter for the second classifier. The function includes a generator, which generates the second embedding for the first embedding. The parameters for the function define the generator. In this way, multiple embeddings are able to be skillfully combined, as a result of which the required parameters of the first classifier are reduced as compared to a concatenation of embeddings. The first classification for the second embedding specifies whether the word is an entity of the knowledge graph or to which entity or to which type of entity the word is to be assigned. The second classification specifies a type for the second embedding. As a function of the type, which is determined for a plurality of second embeddings, it may be identified whether the mapping by the function results in embedding-type clusters of second embeddings for a plurality of words in a shared space. Because the parameters of the function are defined as a function of the parameters of the classification, second embeddings are determined, which form no embedding-type clusters and are therefore particularly well suited for the first classification.

In accordance with an example embodiment of the present invention, a plurality of words may be provided for a training, the first classification of the second embedding being determined using the first classifier for at least one portion of the plurality of words, the second classification of the second embedding being determined using the second classifier for the at least one portion of the plurality of words, parameters for which a first function for the first classifier fulfills a first condition for the first classifier being determined as a function of at least one portion of the plurality of words, parameters for the second classifier for which a second function for the second classifier fulfills a second condition being determined as a function of these parameters for the first classifier and of at least a portion of the plurality of words, the first function being defined as a function of the parameters for the first classifier and of the first classification, the second function being defined as a function of the parameters for the second classifier and of the second classification. An adversarial learning with a gradient descent method is preferably used in order to determine the parameters of the classifiers. The second classifier in this case represents a discriminator, which is trained to identify the embedding-type clusters potentially contained in the second embedding. The function in this case includes a generator, which is trained to make it difficult for the discriminator to identify embedding-type clusters.

In accordance with an example embodiment of the present invention, the parameters of the function, and therefore of the generator, are determined preferably as a function of a difference between gradients for the first classifier and gradients for the second classifier. In this way, the parameters of the generator are determined in opposite directions from the discriminator, i.e., with reversed sign, with respect to the gradients of the second classifier.

A plurality of the second embeddings is preferably determined, for each word from a plurality of different words, a group of different first embeddings being determined, and this group being mapped onto a group of second embeddings. Thus, words are able to be mapped from sentences in parallel onto second embeddings, which together are able to form an input for the first classifier.

In accordance with an example embodiment of the present invention, it may be provided that for one word, different types of first embeddings are determined, the various types of first embeddings encompassing a word-based embedding, a letter-based embedding, a subword-based embedding and/or a domain-specific embedding, in particular, for a biomedical or materials science domain. A group of first embeddings of a different type may be provided. These may encompass different types, for example, word-based or letter-based. In this case, a generator maps each first embedding from the group onto a second embedding. In this way, a group of second embeddings is generated. The first classifier calculates a weight for each second embedding and forms thereby a weighted combination, in the example, a sum of the two embeddings. The first classifier makes its classification decision on the basis thereof. The second classifier, the discriminator, attempts to ascertain for the second embeddings from which type the embedding originated.

In accordance with an example embodiment of the present invention, the function may be provided that at least one first embedding of a plurality of first embeddings is mapped using an image onto a second embedding of a predefined dimension. In this way, the embeddings of different words are mapped meaningfully, i.e., with no identifiable embedding-type clusters, onto a shared space as an input for the first classifier.

The weight for the combination of a second embedding with at least one other second embedding may be determined as a function of this one second embedding, the combination being determined as a function of the second embedding weighted with the weight. In this way, a particularly good weighting of the embedding for the combination is achieved.

The combination may be determined with the weight as a function of a product of the second embedding. In this way, a particularly well suited combination is determined.

A plurality of second embeddings may be determined for one word, for the plurality of second embeddings a plurality of products being determined, the combination being determined as a function of a sum of the products. In this way, the required number of parameters in the first classifier is reduced as compared to a concatenation.

The weight may be determined as a function of a feature that characterizes a property of the word. This makes it possible to consider word features, which further improve a placement of the embedding combination in the shared space.

The weight may be mapped using a softmax function onto values between 0 and 1, in particular, weights for different embeddings of a predefinable dimension for the word adding up to 1.

A vector may define an embedding, different vectors for various first embeddings for the word being mapped using an image onto vectors of the same dimension.

The function may determine the second embedding with a generator, which is defined by the parameters. The generator may be an artificial neural network, which is defined by the parameters.

In accordance with an example embodiment of the present invention, the device for determining the knowledge graph is designed to carry out the example method(s).

BRIEF DESCRIPTION OF THE DRAWINGS

Further advantageous specific embodiments result from the following description and from the figures.

DETAILED DESCRIPTION OF EXAMPLE EMBODIMENTS

In order to automatically fill knowledge databases, i.e., knowledge graphs, with contents, entities and concepts may, for example, be extracted from texts. These are then nodes in the knowledge graph.

The identification of entities or concepts may be approached using neural networks. In this case, mainly models, i.e., neural networks are used, which determine individually for each word whether it is an entity/a concept, and if yes, to which class it is to be assigned. A class is a person, place, organization, for example. The words are represented for this purpose by embeddings, for example, vectors, i.e., word embeddings.

The embeddings may be from different languages or may be of a different type or may be based on functions that have been trained by texts of different domains. Examples of a type are word-based, letter-based, context-dependent, domain-dependent (for example, biomedical or materials sciences). The present invention is described taking different types or domains as an example. Different languages are a further possible application.

It is advantageous if the different embeddings that are to be combined are meaningfully situated in a shared space, i.e., in particular, are situated in the shared space based on their semantics and do not form, for example, embedding-type clusters.

Figure 1:
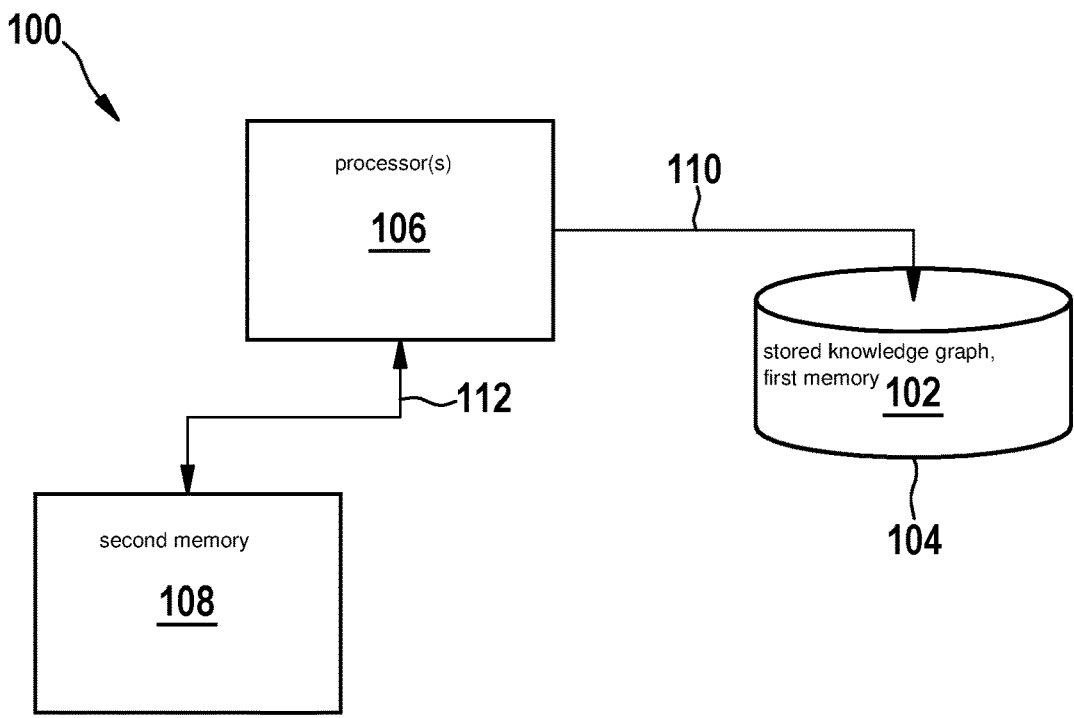
FIG. 1 schematically shows a representation of a device for determining a knowledge graph, in accordance with an example embodiment of the present invention.

A representation of a device 100 for determining a knowledge graph 102 is schematically depicted in FIG. 1. Device 100 includes a first memory 104 for storing knowledge graph 102.

Device 100 includes at least one processor 106. Processor 106 is designed to carry out a method described below. A second memory 108 may be provided, which includes instructions for the at least one processor 106, upon execution of which by at least one processor 106, the method proceeds. Processor 106 may be designed to communicate via a first data line 110 with first memory 104 and/or via a second data line 112 with the second memory.

Figure 2:
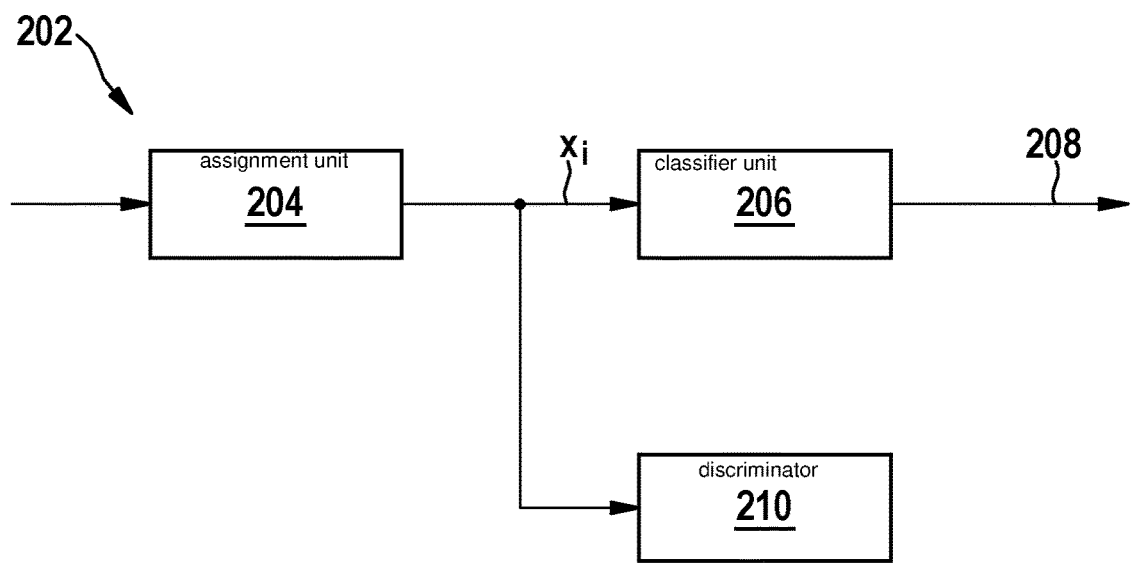
FIG. 2 schematically shows a representation of components for a training of a classifier unit for determining the knowledge graph, in accordance with an example embodiment of the present invention.

FIG. 2 schematically shows a representation of components 202 for a training for determining the knowledge graph. An input for the training is defined by various embeddings $e_i$ for a word. An embedding is defined in the example by a vector in a vector space. The various embeddings $e_i$ may be defined in different vector spaces.

An assignment unit 204 is designed to map the various first embeddings $e_i$ via an image $Q_i$ onto second embeddings $x_i$. In the example, the vectors for a plurality of first embeddings $e_i$ are mapped onto a plurality of vectors for second embeddings $x_i$ in a shared vector space.

A classifier unit 206 is designed to combine second embedding $x_i$ as a function of a weighting $\alpha_i$ of second embedding $x_i$ to form a combination $e^{ATT}$.

In this way, a precision of classifier unit 206 is also increased. The adversarial training described below results in a further increase in precision, since first embeddings $e_i$ are mapped on to second embeddings $x_i$, which form a more meaningful input of classier unit 206 situated in the shared space than is possible by a concatenation of first embeddings $e_i$.

Classifier unit 206 is designed to classify second embedding $x_i$ in a classification 208 for the knowledge graph. For example, classifier unit 206 is designed to classify the weighted combination of second embeddings $x_i$ in terms of whether the word underlying second embedding $x_i$ is an entity of the knowledge graph. For example, classifier unit 206 is designed to classify second embedding $x_i$ in terms of to which entity or to which type of entity the word underlying the second embedding $x_i$ in the knowledge graph is to be assigned.

A discriminator 210 is provided for the training. Discriminator 210 in the example is a classification network. Discriminator 210 is designed to identify an embedding type for a second embedding.

For the training, a group of first embeddings $e_i$ of a different type is provided, for example, these being able to include various types, for example, word-based, letter-based.

Assignment unit 204 in the example includes a generator G. Generator G, for example, maps each first embedding $e_i$ from the group onto a second embedding $x_i$ using an image $Q_i$. A group of second embeddings $x_i$ is thereby generated.

Classifier unit 206 calculates, for example, a weight $\alpha_i$ and a combination $e^{ATT}$ for each second embedding $x_i$ from all second embeddings $x_i$ weighted with their respective weight $\alpha_i$. Classifier unit 206 makes a classification decision using a classifier C based on combination $e^{ATT}$, i.e., in the example, classifier 208 for the knowledge graph.

Discriminator 210 attempts to ascertain for each of second embeddings $x_i$, of which of the different types the first embedding $e_i$ was, with which this second embedding $x_i$ has been determined.

A plurality of second embeddings $x_i$ is determined for the training. A group including various first embeddings $e_i$, for example, is determined for each word from a plurality of different words, and this group is mapped onto a group of second embeddings $x_i$.

In the example, assignment unit 204, discriminator 210 and classifier unit 206 are trained in the training. Discriminator 210 is trained for the purpose, given the plurality of second embeddings $x_i$, of identifying to which embedding type underlying first embedding $e_i$ belongs. Discriminator 201 is designed to identify embedding-type clusters.

With the aid of the technology of gradient reversal, for example, an image is learned by assignment unit 204, which makes it as difficult as possible for discriminator 210 to identify to which embedding type a second embedding belongs. This learning is described below. As a result, discriminator 210 is no longer able to identify any embedding-type clusters. The gradient reversal technology is described, for example, in Yaroslav Ganin, Evgeniya Ustinova, Hana Ajakan, Pascal Germain, Hugo Larochelle, Francois Laviolette, Mario Marchand, and Victor Lempitsky, 2016, "Domain-adversarial training of neural networks," Journal of Machine Learning Research, 17.

The resultant image by assignment unit 204 no longer forms any embedding-type clusters, since such clusters would be easy to discriminate.

This is used below for the automatic identification of entities and concepts in texts. On the basis thereof, entities are able to be automatically extracted and, for example, stored and processed in a database or as nodes in a knowledge graph.

The input may be defined by words in all languages and domains, as long as there are training data for the training.

The application is not limited to the entity identification. Embeddings as input representation play a dominant role in numerous areas of natural language processing (for example, parsing, relation extraction, automatic summarizing of texts, etc.). An application is possible for all these areas.

Classifier unit 206 trained in this manner is designed for an automatic identification of entities and concepts. Assignment unit 204 trained in this manner is designed to map different embedding types in a meaningful manner in a shared space before they are combined.

Assignment unit 204 trained in this manner and classifier unit 206 trained in this manner classify each word of an existing document as belonging or not belonging to a predefined set of classes.

Assignment unit 204 may be implemented as a linear or non-linear image, i.e., as a feed-forward network. Classifier unit 206 may be implemented as a recurrent neural network. The words may be represented by embeddings as word vectors. The recurrent neural network is a feed-back artificial neural network which, in contrast to an artificial neural network that includes the feedforward connection between neurons of various layers, also includes connections of neurons of a layer to neurons of the same or to a preceding layer.

Figure 3:
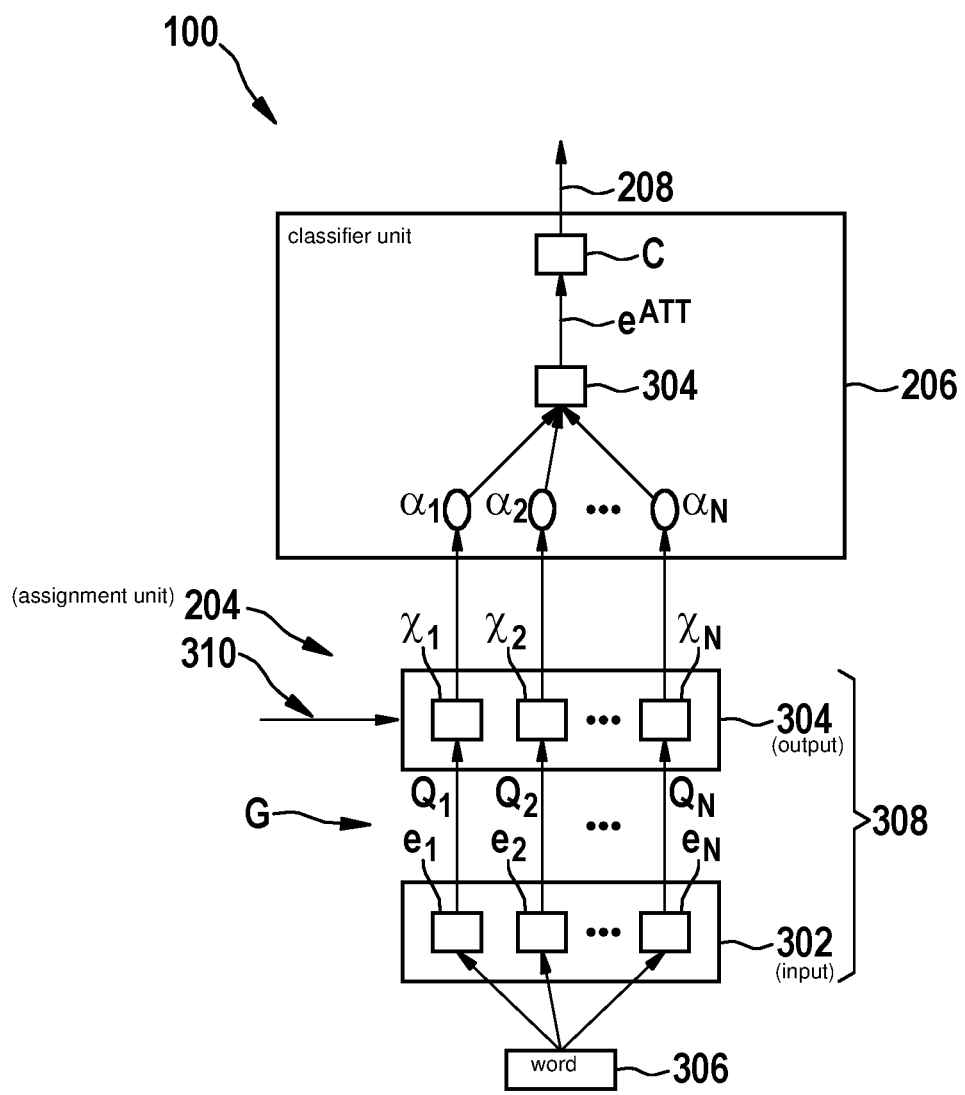
FIG. 3 schematically shows a representation of parts of the classifier unit, in accordance with an example embodiment of the present invention.

FIG. 3 schematically shows a representation of parts of assignment unit 204 and of classifier unit 206. Assignment unit 204 in the example includes an input 302 and an output 304. Input 302 is designed to determine a number N of first embeddings $e_i$. First embeddings $e_i$ for a word 306 are identified in FIG. 3 with $e_1, e_2, \ldots, e_N$.

Various types of first embeddings $e_i$ may be used, for example, word-based embeddings, letter-based embeddings, subword-based embeddings. These may be trained on large volumes of data, for example, messages or Internet articles. For particular domains such as, for example, biomedical or materials science domains, domain-specific embeddings may also be used, i.e., embeddings that have been trained on data of the corresponding domain. Examples of first embeddings $e_i$ that may be determinable, are character embedding, Char, Byte Pair Encoding embeddings, BPEmb, FastText embeddings, fastText, FLAIR embeddings, FLAIR, BERT embeddings, BERT.

Assignment unit 204 includes no input 302 if first embeddings $e_i$ are already provided, for example, from a database. In the example, the N first embeddings $e_i$ are defined in N vector spaces, which may have different dimensions.

Assignment unit 204 includes a function 308, which is situated between input 302 and output 304. Function 308 is designed to determine for each first embedding $e_i$ a second embedding, which is output at output 304. Function 308 is designed to determine second embeddings $x_1, x_2, \ldots, x_N$ for first embeddings $e_1, e_2, \ldots, e_N$.

In the example, the N first embeddings $e_i$ are mapped by function 308 using an image onto N embeddings of the same size E. In the example, N images $Q_1, Q_2, \ldots, Q_N$ are defined for the N first embeddings $e_i$ identified by $e_i, e_2, \ldots, e_N$ for word 306. Each embedding $e_i$ is mapped onto a second embedding $x_i$ by image $Q_i$, where $x_i \in \mathbb{R}^E$. These images in the example are also learned in the training. Images $Q_i$ are defined by a matrix for each embedding type i, which is made up of parameters. These parameters are randomly initialized and then learned during the training. Function 308 may include a generator G. Generator G may include an artificial neural network, which is defined as a function of the parameters for the function.

In one aspect, a word feature $f \in \mathbb{R}^F$ is used as an additional input for function 308. For this purpose, assignment unit 204 may provide an additional input 310. Word feature $f$ may be a vector of size F, which is concatenated, i.e., appended at each of embeddings $x_i$. Examples of word feature $f$ are length, frequency and word form. The length, for example, is taken into account by an image of word 306 as a function of a number of letters that form word 306 onto a vector of dimension F. A one-hot encoding, for example, is used for this purpose. For a dimension F=20, for example, a word is mapped onto a vector that specifies its length. Words that include more than 19 letters may be mapped onto the same vector that specifies the length as 20. A frequency of word 306 is determined, for example, in reverse proportion to its rank in a list sorted according to the appearance of the word in a text. For this purpose, a word2vec embedding is used and evaluated. The word form may, for example, be determined using a method known as SpaCys shape feature.

It may be provided to take multiple word features $f$ into account by concatenating these into a single vector.

Classifier unit 206 is designed to determine for each embedding $x_i$ a weight $\alpha_i$. For this purpose, a completely connected hidden layer of the recurrent neural network of size H may be provided with parameters $W \in \mathbb{R}^{H \times E}$, $U \in \mathbb{R}^{H \times F}$, $V \in \mathbb{R}^{1 \times H}$, the embedding $x_i$ and word feature $f$ defining the input for this layer and weight $\alpha_i$ being determined by $$\alpha_i = \frac{\exp(V \cdot \tanh(W x_i + U f))}{\sum_{l=1}^{n} \exp(V \cdot \tanh(W x_l + U f))}$$

Classifier unit 206 is designed to combine embedding $x_i$ with weight $\alpha_i$ in a weighted manner, in the example, by $$e^{ATT} = \sum_i \alpha_i \cdot x_i$$

the combination $e^{ATT}$ in the example being a sum vector.

For each word 306, for which it is to be determined whether an entity is involved and if yes, which one, a weighted combination $e^{ATT}$ of the different word vectors is calculated, the different first embeddings $e_i$ being mapped onto the same dimension using image $x_i = Q_i e_i$. Different weights $\alpha_i$ are determined for different embeddings $x_i$ with the aid of embeddings $x_i$ themselves and with the aid of word feature $f$. N weights $\alpha_1, \alpha_2 \ldots, \alpha_N$ are mapped in the example using a softmax function onto values between 0 and 1. As a result, N weights $\alpha_1, \alpha_2 \ldots, \alpha_N$ add up to 1.

The different embeddings $x_i$ are multiplied in the example by their respective weight $\alpha_i$ and added together. The sum vector is used as a representation for word 306.

An assignment unit 204 may be provided, which determines a representation for a word 306 to be classified. In the example, different second embeddings $x_i$ are determined successively for different words using an assignment unit 204 as input for classifier unit 206.

Classifier unit 206 is designed to classify the representation for word 306, i.e., a combination $e^{ATT}$. Classifier unit 206 may be designed to classify different combinations $e^{ATT}$ for different words.

Classifier unit 206 in the example includes an artificial neural network including an input layer, a bi-directional long-short term memory, BiLSTM, and a conditional random field output layer, CRF. The BiLSTM network is defined as described, for example, in Sepp Hochreiter and Jürgen Schmidhuber, 1997, "Long short-term memory," Neural computation, 9(8):1735-1780. The CRF is defined as described, for example, in John D. Lafferty, Andrew McCallum, and Fernando C. N. Pereira, 2001, "Conditional random fields: Probabilistic models for segmenting and labeling sequence data," in Proceedings of the Eighteenth International Conference on Machine Learning, ICML '01, pages 282-289, San Francisco, CA, USA. Morgan Kaufmann Publishers Inc. Guillaume Lample, Migeul Balleste-ros, Sandeep Subranamian, Kazuya Kawakami, and Chris Dyer, 2016, "Neural architectures for named entity recognition," in Proc. of NAACL.

Classifier unit 206 is designed for entity identification. Classifier unit 206 classifies weighted word vectors, i.e., different combinations $e^{ATT}$.

The parameters for function 308 and for classifier unit 206 are learned in the training.

Discriminator 210 in the example is a classification network, which represents a logarithmic multi-nominal linear classifier D with a loss function $L_D$, which is based on a cross-correlation.

Classifier unit 206 is trained with a loss function $L_C$ for classifier C for the purpose of improving or maximizing a logarithmic probability of the correct classification of word 306. In the example, classifier C is defined by the CRF. With parameters $\theta_G$ for generator G, from assignment unit 204, parameters $\theta_D$ for classifier D from discriminator 210 and parameters $\theta_C$ for classifier C from classifier unit 206, the parameters with gradients $$\frac{\delta L_D}{\delta \theta_G} \text{ and } \frac{\delta L_D}{\delta \theta_D}$$

for classifier D and gradients $$\frac{\delta L_C}{\delta \theta_G} \text{ and } \frac{\delta L_C}{\delta \theta_C}$$

for classifier C are updated in the example as follows:

$$\theta_D = \theta_D - \eta \lambda \frac{\delta L_D}{\delta \theta_D}$$

$$\theta_C = \theta_C - \eta \lambda \frac{\delta L_C}{\delta \theta_C}$$

$$\theta_G = \theta_G - \eta \left( \frac{\delta L_C}{\delta \theta_G} - \lambda \frac{\delta L_D}{\delta \theta_G} \right)$$

$\eta$ being a learning rate and $\lambda$ being a hyper-parameter for influencing the effects of discriminator 210.

Parameters $\theta_G$ of generator G are therefore determined in the opposite direction of the gradients from loss function $L_D$ for classifier D from discriminator 210. In this way, the second embeddings for different embedding types are unable to form any clusters in the shared embedding space.

One example for an implementation in an artificial neural network is described below for a BiLSTM including a hidden layer with 256 nodes per direction.

The training in the example is a monitored training in epochs provided with batches. A batch may encompass a size of 16 sentences, pairs of words and labels being defined. In the training, a stochastic gradient descent method having a learning rate $\eta = 0.2$ is provided.

It may be provided to cut learning rate $\eta$ in half after 3 successive epochs. Classifier D from discriminator 210 may be trained after k=10 batches each of the training of the BiLSTM.

For character embeddings, the letters of word 306 are represented, for example, by randomly initialized embeddings. These are an input for a BiLSTM including 25 hidden layers in each direction, a state of the last hidden layer in a forward propagation and the state of this layer in a following backward propagation being concatenated into a vector of dimension 50, in order to represent word 306 as first embedding $e_i$.

For FastText embedding, n-gram embeddings are determined, for example, word 306 being determined by a standardized sum of the embeddings of the n-gram for word 306. FastText embedding is described, for example, in Piotr Bojanowski, Edouard Grave, Armand, Joulin, and Tomas Mikolov, 2017, "Enriching word vectors with subword information," Transactions of the Association for Computational Linguistics, 5:135-146.

For BPEmb, Byte Pair Encoding embeddings, for example, are used for generating a word vector, the vectors being determined for components of word 306. Word 306 is subdivided for this purpose in the example into non-overlapping components. The non-overlapping components are determined as a function of their frequency. The vector for the word itself is then determined as a combination, for example, average of the component vectors. BPEem is described, for example, in Benjamin Heinzerling and Michael Strube, 2018, "BPEmb: Tokenization-free Pretrained Subword Embeddings in 275 Languages," in Proceedings of the Eleventh International Conference on Language Resources and Evaluation (LREC 2018), Miyazaki, Japan. European Language Resources Association (ELRA).

For BERT embeddings and for FLAIR embeddings, a pre-trained model is used in the example and a vector is determined for word 306 as a function of all words in the context, for example, of a sentence or of a text that includes word 306. BERT embeddings is described, for example, in Jacob Devlin, Ming-Wei Chang, Kenton Lee, and Kristina Toutanova, 2019, "BERT: Pre-training of deep bidirectional transformers for language understanding," in Proceedings of the 2019 Conference of the North American Chapter of the Association for Computational Linguistics: Human Language Technologies, pages 4171-4186.

FLAIR embeddings are described, for example, in Alan Akbik, Duncan Blythe, and Roland Vollgraf, 2018, "Contextual string embeddings for sequence labeling," in Proceedings of the 27$^{th}$ International Conference on Computational Linguistics, pages 1638-1649 and Alan Akbik, Tanja Bergmann, and Roland Vollgraf, 2019, "Pooled contextualized embeddings for named entity recognition," in Proceedings of the 2019 Conference of the North American Chapter of the Association for Computational Linguistics: Human Language Technologies, pages 724-728.

Domain-specific embeddings are determined, for example using a pre-trained model.

Figure 4:
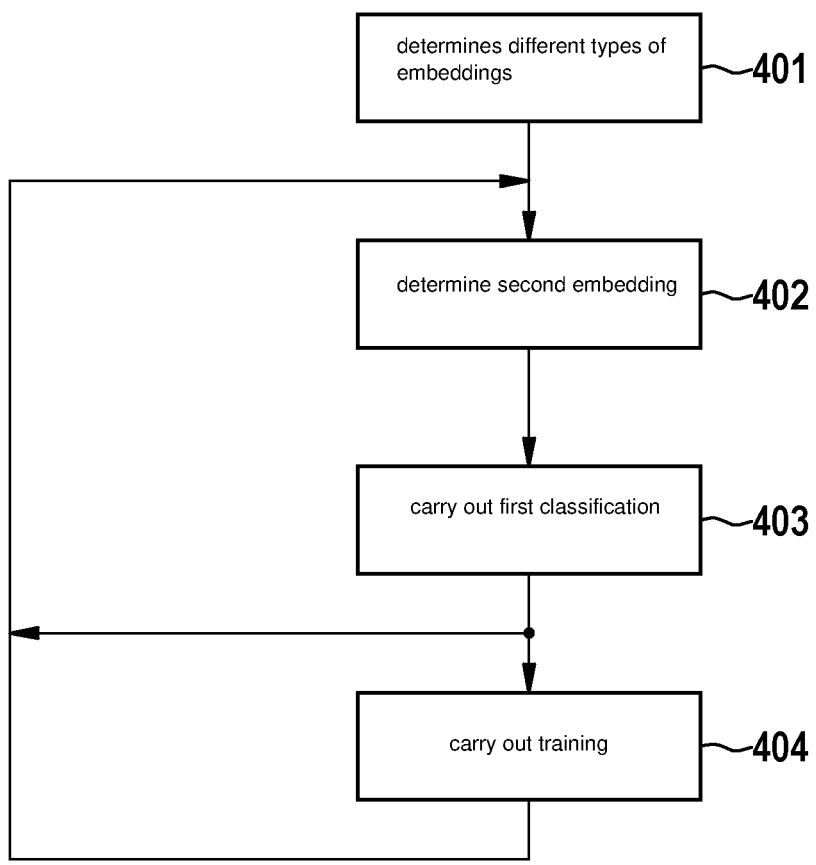
FIG. 4 schematically shows a representation of a method for determining the knowledge graph, in accordance with an example embodiment of the present invention.

A method for determining the knowledge graph is described below with reference to FIG. 4. The method may be carried out for each word 306, for which it is to be determined whether it is an entity and, if yes, which entity.

In an optional step 401, different types of embeddings $e_i$, for example, word-based embeddings, letter-based embeddings, subword-based embeddings are determined for word 306. A domain-specific embedding $e_i$ that has been trained on data of the corresponding domain may also be used in this step for addressing particular domains such as, for example, biomedical or materials science domains.

In the example, a word vector defines first embedding $e_i$. In the example, a plurality of first embeddings $e_i$ is determined for word 306.

In a step 402, a second embedding $x_i$ is determined for word 306 as a function of a first embedding $e_i$:
a. Different first embeddings $e_i$ are mapped onto second embeddings $x_i$ of the same dimension using image Q.

b. For word 306, a combination $e^{ATT}$ made up of two embeddings is determined. Combination $e^{ATT}$ in the example is a weighted combination of the plurality of second embeddings $x_i$. Combination $e^{ATT}$ in the example is a weighted combination of the different word vectors for the plurality of second embeddings $x_i$.

Function 308 calculates weights $\alpha_i$ for different embeddings $x_i$ with the aid of embeddings $x_i$ themselves. It may be provided to determine weights $\alpha_i$ for different second embeddings $x_i$ with the aid of second embeddings $x_i$ themselves and with the aid of the aforementioned additional features, for example, word feature $f$.

It may be provided to map weights $\alpha_i$ using a softmax function onto values between 0 and 1, weights $\alpha_i$ adding up to 1.

c. Different second embeddings $x_i$ are multiplied by their weights $\alpha_i$ and added together. Different second embeddings $x_i$ in the example are weighted word vectors for word 306.

The sum vector thus determined, i.e., combination $e^{ATT}$, defines a representation for word 306.

In a step 403, a first classification, in particular, an entity identification, is carried out with classifier unit 206 for word 306 with the aid of the representation, i.e., with the aid of combination $e^{ATT}$. For example, it is determined as a function of combination $e^{ATT}$ made up of second embeddings $x_i$ whether word 306 is an entity of the knowledge graph. Optionally, it may be determined, in the event word 306 is an entity of the knowledge graph, to which class of entities the word belongs.

In a training, steps 402 through 403 are carried out in epochs with batches of training data, in a step 405, parameters $\theta_C$ for classifier C being determined using loss function $L_C$ for classifier C. Classifier C is trained using loss function $L_C$ for classifier C, in particular, for the purpose of improving or maximizing a logarithmic probability of the correct classification of word 306.

Parameters $\theta_G$ for generator G are determined from discriminator 210 as a function of parameters $\theta_C$ for classifier C and parameters $\theta_D$ for classifier D.

In addition, it may be provided in a step 404, in particular, after a number of batches for the training of classifier C have been executed, to carry out a training for parameters $\theta_D$ for classifier D from discriminator 210. Classifier D determines a second classification for a plurality of second embeddings $x_i$, which specifies whether or not second embedding $x_i$ is to be assigned to one type of embeddings from a plurality of types of embeddings.

A plurality of words 306 is provided for the training. For at least one word 306, the plurality of first embeddings $e_i$ is determined, which define the second embeddings $x_i$.

The first classification of second embeddings $x_i$ is determined for at least a portion of words 306 using first classifier C.

The second classification of second embeddings $x_i$ is determined for at least a portion of words 306 using second classifier D.

As a function of at least one portion of the plurality of words 306, parameters $\theta_C$ for first classifier C are determined, for which a first function, loss function $L_C$ for first classifier C, fulfills a first condition. For example, a value of loss function $L_C$ is to be reduced or minimized.

As a function of these parameters $\theta_C$ for first classifier C and of at least one portion of the plurality of words 306, parameters $\theta_D$ for second classifier D are determined, for which a second function, loss function $L_D$ for second classifier D fulfills a second condition. For example, a value of loss function $L_D$ is to be reduced or minimized.

First function $L_C$ is defined as a function of parameters $\theta_C$ for first classifier C and of the first classification.

Second function $L_D$ is defined as a function of parameters $\theta_D$ for second classifier D and of the second classification.

The training in the example encompasses multiple iterations and ends, for example, after a predefined number of epochs.

What is claimed is:

1. A training method for determining a knowledge graph, the method comprising the following steps:
    determining, using a function, a respective second embedding for each of a plurality of respective first embeddings for a word, wherein each of the plurality of respective first embeddings of the word is represented by a respective vector and each of the plurality of respective first embeddings for the word being a different type of embedding, each type of embedding being selected from: a character embedding, a Byte Pair Encoding embedding, a FastText embedding, a FLAIR embedding, a BERT embedding, a domain-specific embedding, and wherein each of the respective second embeddings is determined by the function mapping the respective first embedding to the respective second embedding using a respective image;
    determining based on a weighted combination of the respective second embeddings, using a first classifier, a first classification for the word, the first classification defining whether or not the word is an entity for the knowledge graph, and when the word is an entity, the first classification defining to which type of entity for the knowledge graph the word in the knowledge graph is to be assigned;
    determining for each of the respective second embeddings, using a discriminator, a second classification which defines to which type of embedding from the different types of embeddings of the respective first embeddings, the second embedding is to be assigned;
    training at least one parameter for the function in a training as a function of at least one gradient for a training of the first classifier and as a function of at least one gradient for a training of the discriminator.

2. The method as recited in claim 1, wherein a plurality of words is provided for the training, the first classification of being determined using the first classifier for each word of at least one portion of the plurality of words, the second classification of the respective second embeddings being determined using the discriminator for each word of the at least one portion of the plurality of words, and wherein parameters for the first classifier are determined as a function of least one portion of the plurality of words for which a first function for the first classifier fulfills a first condition, and wherein parameters for the discriminator are determined as a function of the parameters for the first classifier and as a function of at least one portion of the plurality of words for which a second function for the discriminator fulfills a second condition, the first function being defined as a function of the parameters for the first classifier and of the first classification, the second function being defined as a function of the parameters for the discriminator and of the second classification.

3. The method as recited in claim 2, wherein parameters of the function are determined as a function of a difference between gradients for the first classifier and gradients for the discriminator.

4. The method as recited in claim 1, wherein the function using which the respective second embeddings is determined using a generator, which is defined by the at least one parameter for the function.

5. The method as recited in claim 1, wherein, a plurality of products are determined multiplying each of the respective second embeddings by a respective weight, and the weighted combination is determined as a function of a sum of the products.

6. The method as recited in claim 5, wherein each of the respective weights is determined as a function of a feature, which characterizes a property of the word.

7. The method as recited in claim 5, wherein the respective weights are is mapped using a softmax function onto values between 0 and 1, wherein the respective weights add up to 1.

8. A training device for determining a knowledge graph, the device comprising at least one processor configured to:
    determine, using a function, a respective second embedding for each of a plurality of respective first embeddings for a word, wherein each of the plurality of respective first embeddings of the word is represented by a respective vector and each of the plurality of respective first embeddings for the word being a different type of embedding, each type of embedding being selected from: a character embedding, a Byte Pair Encoding embedding, a FastText embedding, a FLAIR embedding, a BERT embedding, a domain-specific embedding, and wherein each of the respective second embeddings is determined by the function mapping the respective first embedding to the respective second embedding using a respective image;
    determine based on a weighted combination of the respective second embeddings, using a first classifier, a first classification for the word, the first classification defining whether or not the word is an entity for the knowledge graph, and when the word is an entity, the first classification defining to which type of entity for the knowledge graph the word in the knowledge graph is to be assigned;
    determine for each of the respective second embeddings, using a discriminator, a second classification which defines to which type of embedding from the different types of embeddings of the respective first embeddings, the second embedding is to be assigned;
    train at least one parameter for the function in a training as a function of at least one gradient for a training of the first classifier and as a function of at least one gradient for a training of the discriminator.

9. A non-transitory computer-readable medium on which is stored a computer program including computer-readable instructions for training, the instructions, when executed by a computer, causing the computer to perform the following steps:
    determining, using a function, a respective second embedding for each of a plurality of respective first embeddings for a word, wherein each of the plurality of respective first embeddings of the word is represented by a respective vector and each of the plurality of respective first embeddings for the word being a different type of embedding, each type of embedding being selected from: a character embedding, a Byte Pair Encoding embedding, a FastText embedding, a FLAIR embedding, a BERT embedding, a domain-specific embedding, and wherein each of the respective second embeddings is determined by the function mapping the respective first embedding to the respective second embedding using a respective image;

determining based on a weighted combination of the respective second embeddings, using a first classifier, a first classification for the word, the first classification defining whether or not the word is an entity for the knowledge graph, and when the word is an entity, the first classification defining to which type of entity for the knowledge graph the word in the knowledge graph is to be assigned;

determining for each of the respective second embeddings, using a discriminator, a second classification which defines to which type of embedding from the different types of embeddings of the respective first embeddings, the second embedding is to be assigned;

training at least one parameter for the function in a training as a function of at least one gradient for a training of the first classifier and as a function of at least one gradient for a training of the discriminator.

* * * * *